(12) United States Patent
Sakuma et al.

(10) Patent No.: US 11,221,022 B2
(45) Date of Patent: Jan. 11, 2022

(54) TURBINE HOUSING AND TURBOCHARGER INCLUDING THE SAME

(71) Applicant: MITSUBISHI HEAVY INDUSTRIES ENGINE & TURBOCHARGER, LTD., Sagamihara (JP)

(72) Inventors: Shigeyoshi Sakuma, Tokyo (JP); Eigo Katou, Tokyo (JP); Keigo Sakamoto, Tokyo (JP); Daigo Watanabe, Tokyo (JP); Takashi Arai, Tokyo (JP); Yuta Ishii, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 80 days.

(21) Appl. No.: 16/610,439

(22) PCT Filed: Sep. 27, 2017

(86) PCT No.: PCT/JP2017/035035
§ 371 (c)(1),
(2) Date: Nov. 1, 2019

(87) PCT Pub. No.: WO2019/064388
PCT Pub. Date: Apr. 4, 2019

(65) Prior Publication Data
US 2020/0056628 A1    Feb. 20, 2020

(51) Int. Cl.
*F04D 29/58* (2006.01)
*F02B 39/00* (2006.01)
*F04D 29/42* (2006.01)

(52) U.S. Cl.
CPC .......... *F04D 29/5853* (2013.01); *F02B 39/00* (2013.01); *F04D 29/4206* (2013.01)

(58) Field of Classification Search
CPC ........ F01D 17/165; F01D 25/08; F01D 9/026; F02B 37/24; F02B 39/00; F04D 29/4206;
(Continued)

(56) References Cited

U.S. PATENT DOCUMENTS 9,810,238 B2 *  11/2017  Annati ................... F01D 9/045
9,841,033 B2    12/2017  Henke et al.
(Continued)

FOREIGN PATENT DOCUMENTS

EP   3 543 500 A1   9/2019
GB   2 271 814 A    4/1994
(Continued)

OTHER PUBLICATIONS

International Preliminary Report on Patentability and Written Opinion of the International Searching Authority, dated Apr. 9, 2020, for international Application No. PCT/JP2017/035035, with an English translation.

(Continued)

*Primary Examiner* — Jesse S Bogue
(74) *Attorney, Agent, or Firm* — Birch, Stewart, Kolasch & Birch, LLP.

(57) ABSTRACT

A turbine housing includes an outer housing portion which includes an inner wall internally forming a spiral space, a first heat shield core which separates the spiral space into a scroll flow passage where an exhaust gas flows and a heat shield space positioned on a side of the inner wall, the first heat shield core being disposed so as to face the inner wall in the spiral space, a variable nozzle unit for adjusting a flow of the exhaust gas from the scroll flow passage toward an impeller, the variable nozzle unit being disposed on a side opposite to the outer housing portion across the first heat shield core in an axial direction, and at least one annular seal (Continued)

portion disposed between the first heat shield core and the outer housing portion in the axial direction.

12 Claims, 11 Drawing Sheets

(58) Field of Classification Search
CPC ............. F04D 29/5853; F05D 2220/40; F05D 2260/231
See application file for complete search history.

(56) References Cited

U.S. PATENT DOCUMENTS

| | | | | |
|---|---|---|---|---|
| 9,850,777 | B2 | 12/2017 | Uesugi | |
| 10,718,261 | B2* | 7/2020 | Giselmo | F02C 6/12 |
| 2010/0316494 | A1 | 12/2010 | Grußmann et al. | |
| 2012/0023928 | A1* | 2/2012 | Smatloch | F01D 25/243 |
| | | | | 60/598 |
| 2012/0263585 | A1* | 10/2012 | Matsuyama | F16J 15/0887 |
| | | | | 415/204 |
| 2014/0212277 | A1* | 7/2014 | Uesugi | F01D 17/145 |
| | | | | 415/151 |
| 2016/0076432 | A1* | 3/2016 | Kindi | F01D 25/14 |
| | | | | 60/605.1 |
| 2016/0290163 | A1 | 10/2016 | Yokoyama et al. | |
| 2016/0326893 | A1* | 11/2016 | Baldwin | F01D 9/026 |
| 2016/0369645 | A1* | 12/2016 | Malone | F02B 39/005 |
| 2017/0335758 | A1* | 11/2017 | Giselmo | F01D 11/005 |
| 2018/0016942 | A1* | 1/2018 | Sakamoto | F01D 25/28 |
| 2019/0048742 | A1* | 2/2019 | Chiba | F01D 25/145 |
| 2019/0316516 | A1 | 10/2019 | Arai | |

FOREIGN PATENT DOCUMENTS

| | | | |
|---|---|---|---|
| JP | 61-125607 U | 8/1986 | |
| JP | 2002-4871 A | 1/2002 | |
| JP | 2006-125588 A | 5/2006 | |
| JP | 2010-285989 A | 12/2010 | |
| JP | 2014-145300 A | 8/2014 | |
| JP | WO2015/097872 A1 | 7/2015 | |
| JP | 5880463 B2 | 3/2016 | |
| JP | 6060315 B2 | 1/2017 | |
| WO | WO 2012-127531 A1 | 9/2012 | |
| WO | WO 2015/097872 A1 | 7/2015 | |
| WO | WO 2016/139799 A1 | 9/2016 | |
| WO | WO 2018/179328 A1 | 10/2018 | |

OTHER PUBLICATIONS

International Search Report, dated Dec. 19, 2017, for International Application No. PCT/JP2017/035035, with an English translation.
Extended European Search Report for European Application No. 17927420.4, dated May 6, 2020.
Japanese Office Action for Japanese Application No. 2019-545458, dated Apr. 28, 2020, with an English translation.

* cited by examiner

TURBINE HOUSING AND TURBOCHARGER INCLUDING THE SAME

TECHNICAL FIELD

The present disclosure relates to a turbine housing and a turbocharger.

BACKGROUND

In general, in an internal combustion engine for a ship, an automobile, or the like, a turbocharger is known which rotates a turbine wheel by using an exhaust energy thereof and rotating a compressor wheel disposed coaxially with the turbine wheel, thereby increasing a suction pressure of the internal combustion engine and an output of the internal combustion engine. In order to improve efficiency of the turbocharger, various researches have conventionally been conducted on a structure to suppress heat radiation of an exhaust gas introduced into a turbine housing to the outside of the turbine housing.

In order to suppress external heat radiation of an exhaust gas, Patent Document 1 discloses a structure to form a scroll flow passage guiding the exhaust gas to a turbine impeller by a heat insulating layer with a heat insulating core covered with a sheet-metal shell, thereby achieving insulation.

In order to suppress loss of thermal energy of an exhaust gas by shielding heat to a turbine housing, Patent Document 2 discloses a turbocharger in which a heat shield plate is arranged in the turbine housing.

CITATION LIST

Patent Literature

Patent Document 1: JP6060315B
Patent Document 2: JP5880463B

SUMMARY

Technical Problem

However, efficiency of a turbine is decreased if an exhaust gas leaks out not via a turbine impeller even though it is possible to suppress heat radiation of the exhaust gas to the outside of a turbine housing.

Thus, in view of the above, an object of at least one embodiment of the present invention is to provide a turbocharger capable of improving efficiency of the turbine by high sealing performance while suppressing heat radiation of an exhaust gas introduced into the turbine housing.

Solution to Problem (1) A turbine housing according to some embodiments of the present invention includes an outer housing portion which includes an inner wall internally forming a spiral space, a first heat shield core which separates the spiral space into a scroll flow passage where an exhaust gas flows and a heat shield space positioned on a side of the inner wall, the first heat shield core being disposed so as to face the inner wall in the spiral space, a variable nozzle unit for adjusting a flow of the exhaust gas from the scroll flow passage toward an impeller, the variable nozzle unit being disposed on a side opposite to the outer housing portion across the first heat shield core in an axial direction, and at least one annular seal portion disposed between the first heat shield core and the outer housing portion in the axial direction.

With the above configuration (1), it is possible to reduce the amount of the exhaust gas leaking outside from the scroll space not via the turbine impeller by the annular seal portion disposed between the first heat shield core and the outer housing portion. Since the annular seal portion is disposed in the heat shield space between the first heat shield core and the outer housing portion, the annular seal portion is not directly exposed to the exhaust gas, deterioration of the annular seal portion is suppressed, and high sealing performance can be maintained. Thus, it is possible to improve efficiency of a turbine.

(2) In some embodiments, in the above configuration (1), the variable nozzle unit includes a nozzle mount, a nozzle plate disposed separately from the nozzle mount on a turbine outlet side, a nozzle support coupling and fixing the nozzle mount and the nozzle plate, and a plurality of variable nozzles circumferentially arranged between the nozzle mount and the nozzle plate, and adjusting the flow of the exhaust gas, the nozzle plate includes an annular portion facing the nozzle mount, and a cylindrical portion protruding from an inner circumferential end of the annular portion toward the outer housing portion in the axial direction, the first heat shield core includes a first inner flange portion surrounding the cylindrical portion of the nozzle plate, and the first inner flange portion is configured such that at least a radial region of the first inner flange portion is pressed against the annular portion of the nozzle plate by the annular seal portion.

With the above configuration (2), since the first inner flange portion of the first heat shield core and the annular portion of the nozzle plate are substantially brought into close contact with each other in at least the radial region of the first inner flange portion, it is possible to suppress leakage of the exhaust gas via a gap between the first inner flange portion and the annular portion in the region. Thus, it is possible to further reduce the amount of the exhaust gas leaking outside not via the turbine impeller and to achieve superior seal performance.

(3) In some embodiments, in the above configuration (2), the turbine housing further includes a second heat shield core which covers a region of a gas path surface of the nozzle mount contacting the exhaust gas from an outermost peripheral part thereof to at least an inner side of the nozzle support in a radial direction.

In a typical turbocharger, the flow of the exhaust gas from the scroll flow passage toward the turbine impeller is throttled in a region on the inner side of the nozzle support, increasing the flow velocity of the exhaust gas. Thus, in the region on the inner side of the nozzle support, a heat-transfer coefficient tends to be relatively high, and it is desirable to reduce heat loss of the exhaust gas in the region.

In this regard, with the above configuration (3), since by the region to the inner side of the nozzle support is covered with the second heat shield core, it is possible to effectively decrease external heat loss via the nozzle mount and to improve efficiency of the turbine. Moreover, the temperature of the nozzle mount itself is decreased by shielding at least a part of the gas path surface from heat of the exhaust gas, and a heat stress is reduced, making it possible to improve the fatigue lifetime of the nozzle mount.

(4) In some embodiments, in the above configuration (3), the turbine housing further includes an insulated space disposed between the nozzle mount and the second heat shield core.

With the above configuration (4), since the insulated space is disposed between the nozzle mount and the second heat shield core, it is possible to further reduce heat of the exhaust gas transferred to the nozzle mount and to effectively enhance the heat insulating effect as described in the above configuration (3).

(5) In some embodiments, in the above configuration (3) or (4), the second heat shield core is interposed and fixed between the nozzle mount and a swaging portion of the nozzle support.

With the above configuration (5), since the second heat shield core and the nozzle mount are fixed to be held together by the swaging portion, it is possible to use the swaging portion for fixing the nozzle support to the nozzle mount in order to fix the second heat shield core as well. With such a simple structure, it is possible to install the second heat shield core so as to cover the gas path surface of the nozzle mount.

(6) In some embodiments, in any one of the above configurations (1) to (5), at least the one annular seal portion includes a spring ring configured to be elastically deformable in the axial direction, the variable nozzle unit includes a nozzle mount, a nozzle plate disposed separately from the nozzle mount on a turbine outlet side, a nozzle support coupling and fixing the nozzle mount and the nozzle plate, and a plurality of variable nozzles circumferentially arranged between the nozzle mount and the nozzle plate, and adjusting the flow of the exhaust gas, the first heat shield core includes a first outer flange portion forming an outermost peripheral part of the first heat shield core, and fixed so as to be interposed between the outer housing portion and an outer peripheral part of the nozzle mount, and a first inner flange portion forming an innermost peripheral part of the first heat shield core, and elastically fixed between the outer housing portion and the nozzle plate via the spring ring.

In the above configuration (6), while the outermost peripheral part (first outer flange portion) of the first heat shield core is interposed between the outer housing portion and the outer peripheral part of the nozzle mount, the innermost peripheral part (first inner flange portion) of the first heat shield core is elastically fixed via the spring ring. Thus, it is possible to allow thermal deformation of the first heat shield core caused by heat input from the exhaust gas to some extent by the spring ring and to reduce the heat stress generated in the first heat shield core. Therefore, it is possible to improve durability of the first heat shield core.

(7) In some embodiments, in any one of the above configurations (1) to (6), at least the one annular seal portion includes a snap ring configured to be elastically deformable in a radial direction.

With the above configuration (7), even if a radial gap is generated between the first heat shield core and a member extending in the axial direction, it is possible to reduce the gap by elastically deforming the annular seal portion in the radial direction. Therefore, it is possible to reduce the amount of the exhaust gas leaking outside not via the turbine impeller and to improve efficiency of the turbine.

(8) In some embodiments, in any one of the above configurations (1) to (7), the outer housing portion includes an outlet wall portion which forms a turbine outlet flow passage where the exhaust gas after passing through a turbine flows, and the outlet wall portion internally includes a cooling passage where a refrigerant flows.

Since the first heat shield core is disposed in the spiral space as described in the above configuration (1), it is possible to suppress a temperature increase in a section of the outer housing forming the spiral space. On the other hand, the outlet wall portion of the outer housing is directly exposed to the exhaust gas after passing through the turbine impeller unless special measures such as disposing a third heat shield core to be described later are taken. As a result, the temperature tends to increase. In this case, a material for the outer housing needs to be chosen in accordance with a condition of relatively high temperature in the outlet wall portion of the outer housing, decreasing the freedom of choice of the material for the outer housing.

With the above configuration (8), since the outlet wall portion internally includes the cooling passage in the turbine outlet flow passage, it is possible to entirely reduce the temperature of the outer housing in combination with adoption of the first heat shield core in the above configuration (1). Thus, it is possible to improve strength without adopting an expensive material as the material for the outer housing and to reduce a manufacturing cost.

(9) In some embodiments, in the above configuration (8), the refrigerant contains compressed air generated by a compressor.

With the above configuration (9), it is possible to cool the outlet wall portion of the outer housing portion without additionally preparing a refrigerant, making it possible to reduce the cost.

(10) In some embodiments, in any one of the above configurations (1) to (9), the outer housing portion includes an outlet wall portion which forms a turbine outlet flow passage where the exhaust gas after passing through a turbine flows, and the turbine housing further includes a third heat shield core disposed in the turbine outlet flow passage so as to face an inner wall surface of the outlet wall portion.

With the above configuration (10), the third heat shield core prevents the turbine outlet wall portion from being directly exposed to the exhaust gas, making it possible to suppress transfer of the heat of the exhaust gas to the turbine outlet wall portion. Therefore, it is possible to entirely decrease the temperature of the outer housing in combination with adoption of the first heat shield core in the above configuration (1), to improve the strength without adopting the expensive material as the material for the outer housing, and to reduce the manufacturing cost.

(11) In some embodiments, in the above configuration (10), the third heat shield core includes a second flange portion protruding radially outward at an axial position between the variable nozzle unit and the outlet wall portion of the outer housing portion, and a bent part formed by bending a part of the second flange portion is interposed between the variable nozzle unit and the outlet wall portion so as to be elastically deformable in the axial direction.

With the above configuration (11), since the bent part of the second flange portion is interposed between the variable nozzle unit and the outlet wall portion, it is possible to reduce the amount of the exhaust gas leaking out from the scroll flow passage to the outlet flow passage not via the turbine impeller. Therefore, it is possible to improve efficiency of the turbine. Furthermore, since the bent part of the third heat shield core is interposed between the variable nozzle unit and the outlet wall portion so as to be elastically deformable, and the second flange portion is not restrained firmly, it is possible to absorb thermal deformation of the third heat shield core to some extent by elastic deformation of the bent part and to reduce a heat stress in the third heat shield core.

(12) A turbine housing according to some embodiments of the present invention includes an outer housing portion which includes an inner wall internally forming a spiral space, a first heat shield core which separates the spiral space into a scroll flow passage where an exhaust gas flows and a heat shield space positioned on a side of the inner wall, the first heat shield core being disposed so as to face the inner wall in the spiral space, a variable nozzle unit for adjusting a flow of the exhaust gas from the scroll flow passage toward an impeller, the variable nozzle unit being disposed on a side opposite to the outer housing portion across the first heat shield core in an axial direction, and the first heat shield core includes a first inner flange portion contacting at least one of the outer housing portion or the variable nozzle unit, and the first inner flange portion is configured to be elastically deformable so as to be pressed against a side of the outer housing portion or a side of the variable nozzle unit while being mounted to the turbine housing.

The above configuration (12) aims at solving the problem of reducing the heat stress in the first heat shield core, which is different from the above-described problem (improving efficiency of the turbine by suppressing heat radiation of the exhaust gas and improving sealing performance).

That is, with the above configuration (12), since the first inner flange portion of the first heat shield core is configured to be elastically deformable so as to be pressed against the side of the outer housing portion or the side of the variable nozzle unit, and the first inner flange portion is not restrained firmly, it is possible to absorb thermal deformation of the first heat shield core to some extent by elastic deformation of the first inner flange portion and to reduce the heat stress in the first heat shield core.

The above configuration (12) can be used in combination with the above-described various configurations (1) to (11). For example, in the above configuration (12), at least the one annular seal portion may be disposed between the first heat shield core and the outer housing portion. Thus, it is possible to achieve firmer seal performance.

(13) In some embodiments, in the above configuration (12), the first inner flange portion includes a bent part formed by bending a part of the first inner flange portion, and the bent part is interposed between the variable nozzle unit and the outer housing portion so as to be elastically deformable in the axial direction.

With the above configuration (13), since the bent part provided for the first inner flange portion of the first heat shield core is elastically deformed, it is possible to effectively absorb thermal deformation of the first heat shield core and to reduce the heat stress generated in the first heat shield core. Therefore, it is possible to improve durability of the first heat shield core with a simple configuration without additionally using another member.

(14) A turbocharger according to some embodiments of the present invention includes a turbine which includes the turbine housing according to any one of the above configurations (1) to (13) and an impeller configured to be rotated by the exhaust gas guided via the scroll flow passage of the turbine housing, and a compressor driven by the turbine.

With the above configuration (14), if the annular seal portion is disposed between the first heat shield core and the outer housing portion as described in the above configuration (1), it is possible to reduce the amount of the exhaust gas leaking outside from the scroll space not via the turbine impeller. Since the annular seal portion is disposed in the heat shield space between the first heat shield core and the outer housing portion, the annular seal portion is not directly exposed to the exhaust gas, deterioration of the annular seal portion is suppressed, and high sealing performance can be maintained. Thus, it is possible to improve efficiency of the turbine.

Alternatively, if the first inner flange portion of the first heat shield core is configured to be elastically deformable so as to be pressed against the side of the outer housing portion or the side of the variable nozzle unit as described in the above configuration (12), since the first inner flange portion is not restrained firmly, it is possible to absorb thermal deformation of the first heat shield core to some extent by elastic deformation of the first inner flange portion and to reduce the heat stress in the first heat shield core.

Advantageous Effects

According to at least one embodiment of the present invention, it is possible to provide a turbine housing and a turbocharger including the same capable of improving efficiency of a turbine by high sealing performance while suppressing heat radiation of an exhaust gas introduced into the turbine housing, and capable of improving mass productivity.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

First Embodiment

Figure 1:
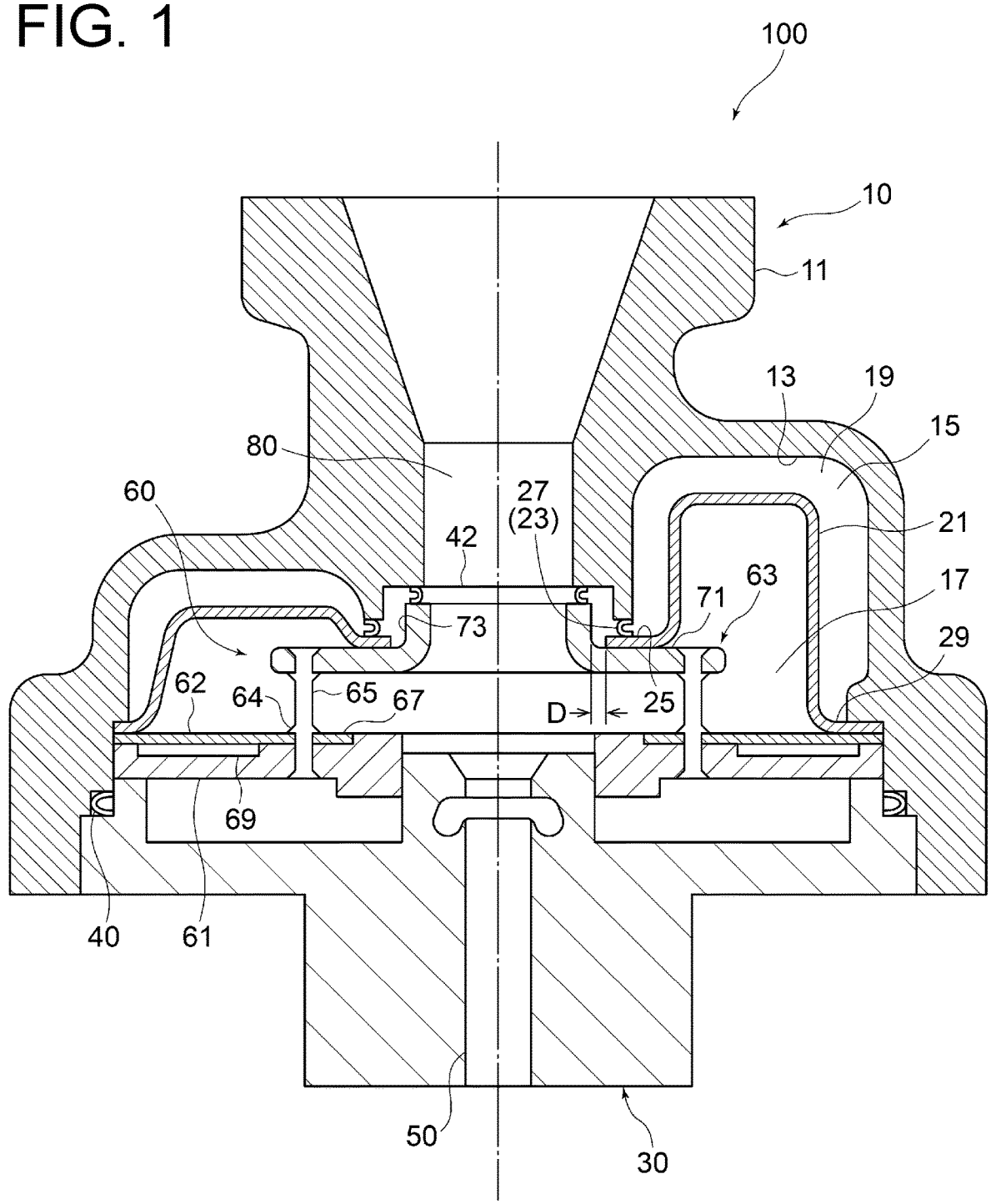
FIG. 1 is a schematic cross-sectional view of the overall configuration of a turbocharger to which a turbine housing is applied according to some embodiments.
Figure 2:
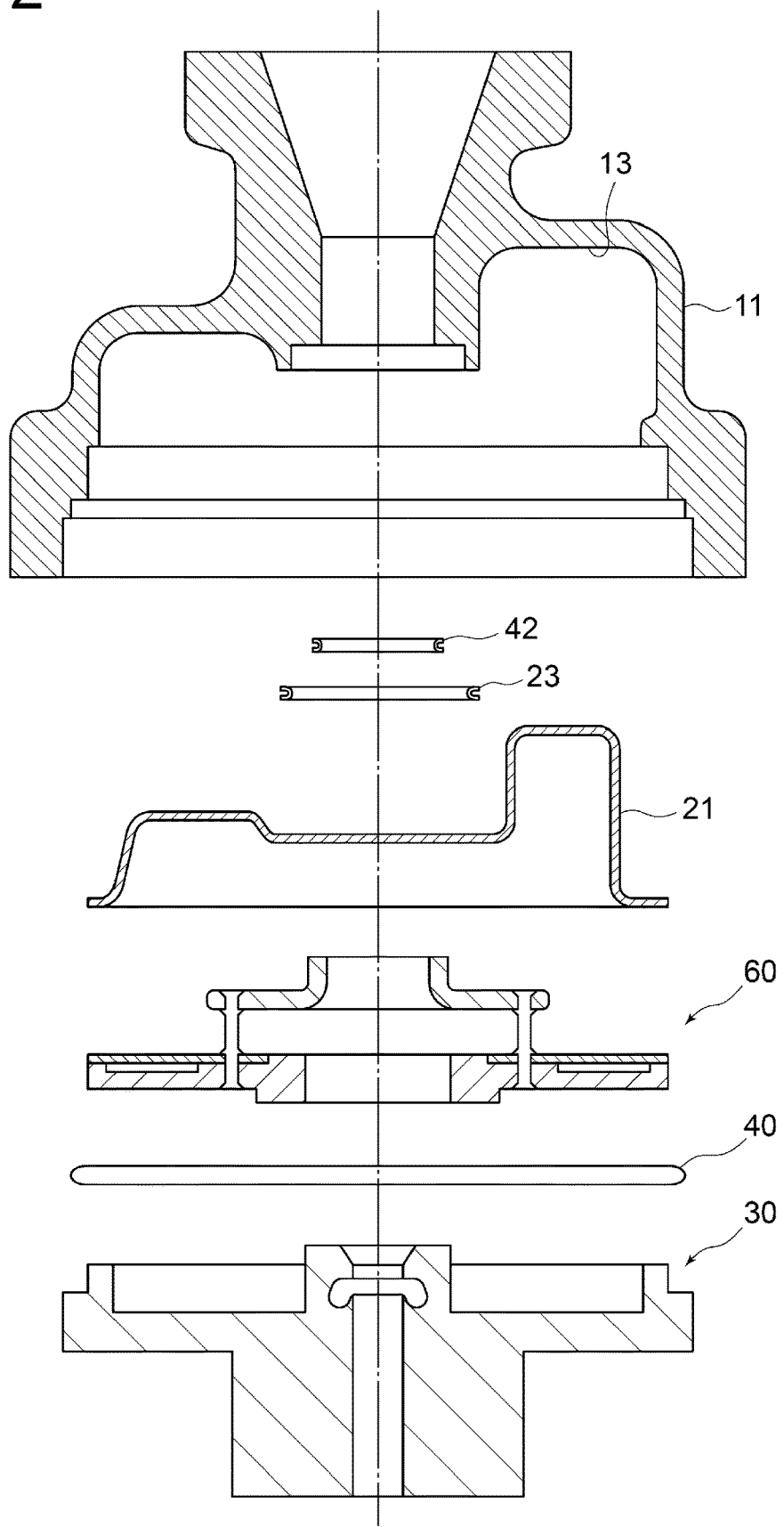
FIG. 2 is an exploded view of the turbocharger shown in FIG. 1.

First, the overall configuration of a turbocharger to which a turbine housing is applied according to some embodiments will be described with reference to FIGS. 1 and 2. FIG. 1 is a schematic cross-sectional view of the turbocharger according to an embodiment. FIG. 2 is an exploded view of the turbocharger shown in FIG. 1.

A turbocharger 100 to which a turbine housing 10 is applied according to some embodiments rotates a compressor impeller (not shown) coupled to a turbine impeller (not shown) via a rotational shaft, thereby generating compressed air and supplying the compressed air to an internal combustion engine. As shown in FIGS. 1 and 2, the turbocharger 100 includes a turbine housing 10 and a bearing housing 30. The turbine housing 10 internally houses the turbine impeller. The bearing housing 30 houses a bearing (not shown) rotatably supporting a rotational shaft 50 of the turbine impeller. The turbine housing 10 and the bearing housing 30 are coupled by a fastener (not shown). A seal ring 40 is disposed in abutting contact with both the turbine housing 10 and the bearing housing 30.

The seal ring 40 is a member formed into an annular shape in the circumferential direction, and formed into a C-shape with its cross-sectional surface bending. The seal ring 40 is configured to be elastically deformable in the axial direction and has a restoring force by being compressed in the axial direction when the bearing housing 30 is fastened to the turbine housing 10. With the restoring force, a circumferential sealing region is formed between the turbine housing 10 and the bearing housing 30.

The turbine housing 10 includes an outer housing portion 11 and internally forms a spiral space 15 by an inner wall 13 of the outer housing portion 11. The spiral space 15 is separated, by a first heat shield core 21, into a scroll flow passage 17 where an inflow exhaust gas flows and an insulated space 19. The insulated space 19 suppresses external loss of heat of the exhaust gas flowing through the scroll flow passage 17 from the first heat shield core 21 via the outer housing portion 1. Thus, providing the first heat shield core 21, it is possible to suppress loss of thermal energy of the exhaust gas before the exhaust gas is introduced into the turbine impeller and to expect an improvement in efficiency of the turbine.

The insulated space 19 may include a heat insulating material (not shown).

Next, some embodiments related to a variable nozzle unit 60 will be described. The variable nozzle unit 60 provided in the turbine housing 10 is a mechanism for guiding the exhaust gas flowing into the scroll flow passage 17 from an exhaust gas inlet portion (not shown) of the outer housing portion 11 to the turbine impeller. In addition, the variable nozzle unit 60 has a function of appropriately controlling the rotation speed of the turbine impeller by adjusting the flow rate of the exhaust gas introduced into the turbine impeller by adjusting a nozzle opening degree. The seal ring 42 is provided in order to shield between the variable nozzle unit 60 and the outer housing portion 11.

As shown in FIG. 2, when assembling the turbine housing 10, the seal ring 42, an annular seal portion 23, the first heat shield core 21, and the variable nozzle unit 60 are installed in this order with respect to the outer housing portion 11.

The structure of the variable nozzle unit 60 will be described with continuous reference to FIG. 1. As shown in FIG. 1, the variable nozzle unit 60 includes a nozzle mount 61 and a nozzle plate 63. The nozzle mount 61 is disposed on the side of the bearing housing 30. The nozzle plate 63 is disposed separately from the nozzle mount 61 on the side of a turbine outlet flow passage 80. The nozzle plate 63 includes an annular portion 71 and a cylindrical portion 73. The annular portion 71 faces the nozzle mount 61. The cylindrical portion 73 protrudes from the inner circumferential end of the annular portion 71 toward the outer housing portion 11 in the axial direction. The nozzle mount 61 and the nozzle plate 63 are coupled and fixed by nozzle supports 65 disposed at predetermined intervals in the circumferential direction. The nozzle mount 61 includes a plurality of variable nozzles (not shown) arranged in the circumferential direction on a side facing the nozzle plate 63. Opening-closing operations of the variable nozzles are performed by a vane operation link mechanism (not shown) disposed between the nozzle mount 61 and the bearing housing 30 in the axial direction.

In some embodiments, the turbine housing 10 includes a second heat shield core 62 which covers a region of a gas path surface 67 of the nozzle mount 61 contacting the exhaust gas from an outermost peripheral part thereof to at least an inner side of the nozzle supports 65 in the radial direction.

The gas path surface 67 of the nozzle mount 61 refers to a section of the outer surface of the nozzle mount 61 which faces an exhaust gas flow passage including the scroll flow passage 17. Moreover, the inner side of the nozzle supports 65 means an inner side of the diameter of a circle made by the plurality of nozzle supports 65 (nozzle support PCD) disposed at the predetermined intervals in the circumferential direction.

In a typical turbocharger, the flow of the exhaust gas from the scroll flow passage 17 toward the turbine impeller is throttled in a region on the inner side of the nozzle support PCD, increasing the flow velocity of the exhaust gas. Thus, in the region on the inner side of the nozzle support PCD, a heat-transfer coefficient tends to be relatively high, and it is desirable to reduce heat loss of the exhaust gas in the region.

In this regard, according to the present embodiment, it is possible to effectively decrease external heat loss via the nozzle mount 61 by covering the region on the inner side of the nozzle support PCD with the second heat shield core 62 and to improve efficiency of the turbine. Moreover, the temperature of the nozzle mount 61 itself is decreased by shielding at least a part of the gas path surface 67 from heat of the exhaust gas, and a heat stress is reduced, making it possible to improve the fatigue lifetime of the nozzle mount 61. On the other hand, since the temperature of the nozzle mount 61 is decreased, it is also possible to suppress a temperature increase of the vane operation link mechanism disposed between the nozzle mount 61 and the bearing housing 30 in the axial direction, and to improve operability of the variable nozzles.

In an embodiment, the entire surface of the gas path surface 67 of the nozzle mount 61 may be covered with the second heat shield core 62.

In some embodiments, an insulated space 69 is provided between the nozzle mount 61 and the second heat shield core 62. The insulated space 69 may include a heat insulating material (not shown).

According to the present embodiment, since the insulated space 69 (or the heat insulating material housed in the insulated space 69) is provided between the nozzle mount 61 and the second heat shield core 62, it is possible to further reduce heat of the exhaust gas transferred to the nozzle mount 61 and to effectively enhance the above-described heat insulating effect.

In some embodiments, the second heat shield core 62 is interposed and fixed between the nozzle mount 61 and swaging portions 64 of the nozzle supports 65.

According to the present embodiment, since the second heat shield core 62 and the nozzle mount 61 are fixed to be held together by the swaging portions 64, it is possible to use the swaging portions 64 for fixing the nozzle supports 65 to the nozzle mount 61 in order to fix the second heat shield core 62 as well. With such a simple structure, it is possible to install the second heat shield core 62 so as to cover the gas path surface 67 of the nozzle mount 61.

Next, a seal structure between the outer housing portion 11 and the nozzle plate 63 will be described.

In some embodiments, as shown in FIG. 1, at least the one annular seal portion 23 is disposed between the first heat shield core 21 and the outer housing portion 11 in the axial direction.

According to the present embodiment, with the annular seal portion 23 disposed between the first heat shield core 21 and the outer housing portion 11, it is possible to reduce the amount of the exhaust gas leaking outside from the scroll flow passage 17 not via the turbine impeller. Since the annular seal portion 23 is disposed in the heat shield space 19 between the first heat shield core 21 and the outer housing portion 11, the annular seal portion 23 is not directly exposed to the exhaust gas, deterioration of the annular seal portion 23 is suppressed, and high sealing performance can be maintained. Thus, it is possible to improve efficiency of the turbine.

FIG. 1 shows an example in which the annular seal portion 23 is disposed on the inner peripheral side of the first heat shield core 21. However, the present invention is not limited to this. For example, at least the one annular seal portion 23 may be disposed between the outer housing portion 11 and a section on the outer peripheral side of the first heat shield core 21.

Moreover, in some embodiments, a first inner flange portion 25 of the first heat shield core 21 is configured such that at least a radial region of the first inner flange portion 25 is pressed against the annular portion 71 of the nozzle plate 63 by the annular seal portion 23.

According to the present embodiment, since the first inner flange portion 25 of the first heat shield core 21 and the annular portion 71 of the nozzle plate 63 are substantially brought into close contact with each other in at least the radial region of the first inner flange portion 25, it is possible to suppress leakage of the exhaust gas via a gap between the first inner flange portion 25 and the annular portion 71 in the region. Thus, it is possible to further reduce the amount of the exhaust gas leaking outside not via the turbine impeller and to achieve superior seal performance.

In some embodiments, at least the one annular seal portion 23 includes a spring ring 27 configured to be elastically deformable in the axial direction. In an example of FIG. 1, the spring ring 27 has a shape with its cross-sectional surface being bent into a C-shape. Furthermore, the first heat shield core 21 is fixed in a state in which a first outer flange portion 29 forming the outermost peripheral part of the first heat shield core 21 is interposed between the outer housing portion 11 and the nozzle mount 61. The first inner flange portion 25 forming the innermost peripheral part of the first heat shield core 21 is elastically fixed between the outer housing portion 11 and the nozzle plate 63 via the spring ring 27.

According to the present embodiment, while the first outer flange portion 29 of the first heat shield core 21 is interposed between the outer housing portion 11 and the outer peripheral part of the nozzle mount 61, the first inner flange portion 25 of the first heat shield core 21 is elastically fixed via the spring ring 27. Thus, it is possible to allow thermal deformation of the first heat shield core 21 caused by heat input from the exhaust gas to some extent by the spring ring 27 and to reduce a heat stress generated in the first heat shield core 21. Therefore, it is possible to improve durability of the first heat shield core 21.

Figure 3:
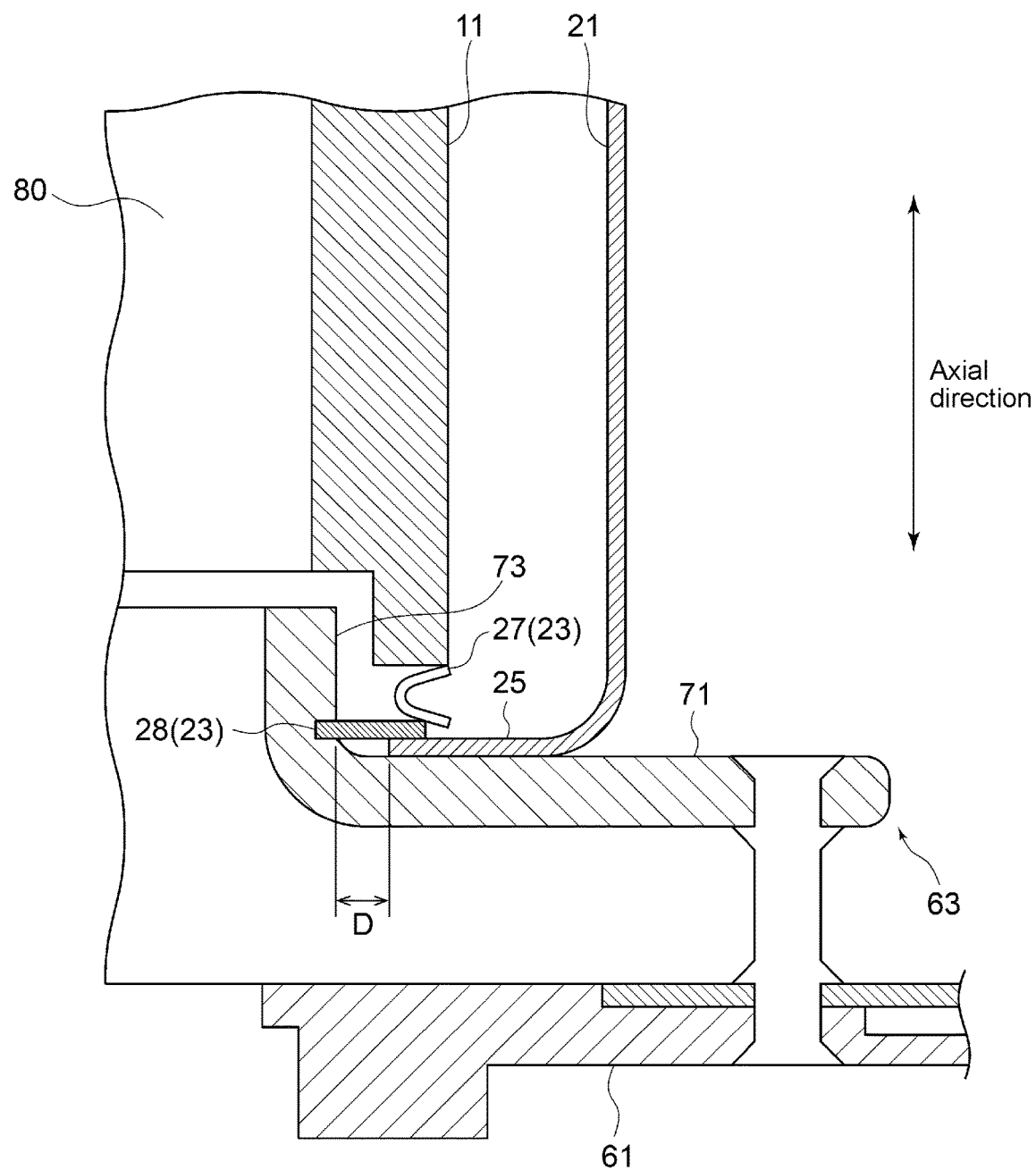
FIG. 3 is an enlarged view of the vicinity of an annular seal portion for showing a modified example.

FIG. 3 is an enlarged view of the vicinity of the annular seal portion 23 for showing a modified example according to the first embodiment. In the modified example shown in FIG. 3, at least the one annular seal portion 23 includes a snap ring 28 configured to be elastically deformable in the radial direction. The snap ring 28 is a member having a restoring force in a diameter reducing direction. The cross-sectional surface of the snap ring 28 as viewed in the axial direction is formed into a C-shape obtained by cutting out a part of an annulus. That is, the snap ring 28 in FIG. 3 is fixed so as to hover over the cylindrical portion 73 of the nozzle plate 63.

According to the present embodiment, even if a radial gap is generated between the first heat shield core 21 and a member extending in the axial direction, it is possible to reduce the gap by elastically deforming the annular seal portion 23 in the radial direction. Therefore, it is possible to reduce the amount of the exhaust gas leaking outside not via the turbine impeller and to improve efficiency of the turbine.

It is also possible to fix the first heat shield core 21 to be interposed between the snap ring 28 and the nozzle plate 63 by substantially bringing the end part of the first inner flange portion 25 into close contact with the annular portion 71 of the nozzle plate 63 using the snap ring 28. Thus, it is possible to integrate the first heat shield core 21 and the nozzle plate 63 with each other in advance upon assembling the turbine, eliminating the need to separately assemble the first heat shield core 21 and the nozzle plate 63 as shown in FIG. 2. As a result, the turbine can be assembled easily.

Even if the first heat shield core 21 is fixed to the nozzle plate 63 with the snap ring 28, the first heat shield core 21 is not fully restrained unlike the case of fixing by welding but is supported by contact. Thus, deformation of the first heat shield core 21 caused by the heat input from the exhaust gas is allowed despite the fact that the first heat shield core 21 is interposed between the snap ring 28 and the nozzle plate 63. Thus, it is possible to reduce the heat stress generated in the first heat shield core 21 and to improve durability of the first heat shield core 21.

In the example shown in FIG. 3, the exhaust gas is sealed in the first inner flange portion 25 of the first heat shield core 21 by using the spring ring 27 and the snap ring 28. However, if the exhaust gas can be sealed by using one of the spring ring 27 or the snap ring 28, the spring ring 27 or the snap ring 28 may be used independently.

FIGS. 1 and 3 each show a state at normal temperature in which the exhaust gas does not flow through the scroll flow passage 17. As shown in FIGS. 1 and 3, at normal temperature, a gap D is formed between the inner peripheral end part of the first inner flange portion 25 and the outer peripheral surface of the cylindrical portion 73 of the nozzle plate 63. Since the gap D is provided at normal temperature, it is possible to suppress contact between the inner peripheral end part of the first inner flange portion 25 and the outer peripheral surface of the cylindrical portion 73 if the first heat shield core 21 is thermally expanded during an operation of flowing the exhaust gas through the scroll flow passage 17.

Second Embodiment

Figure 4:
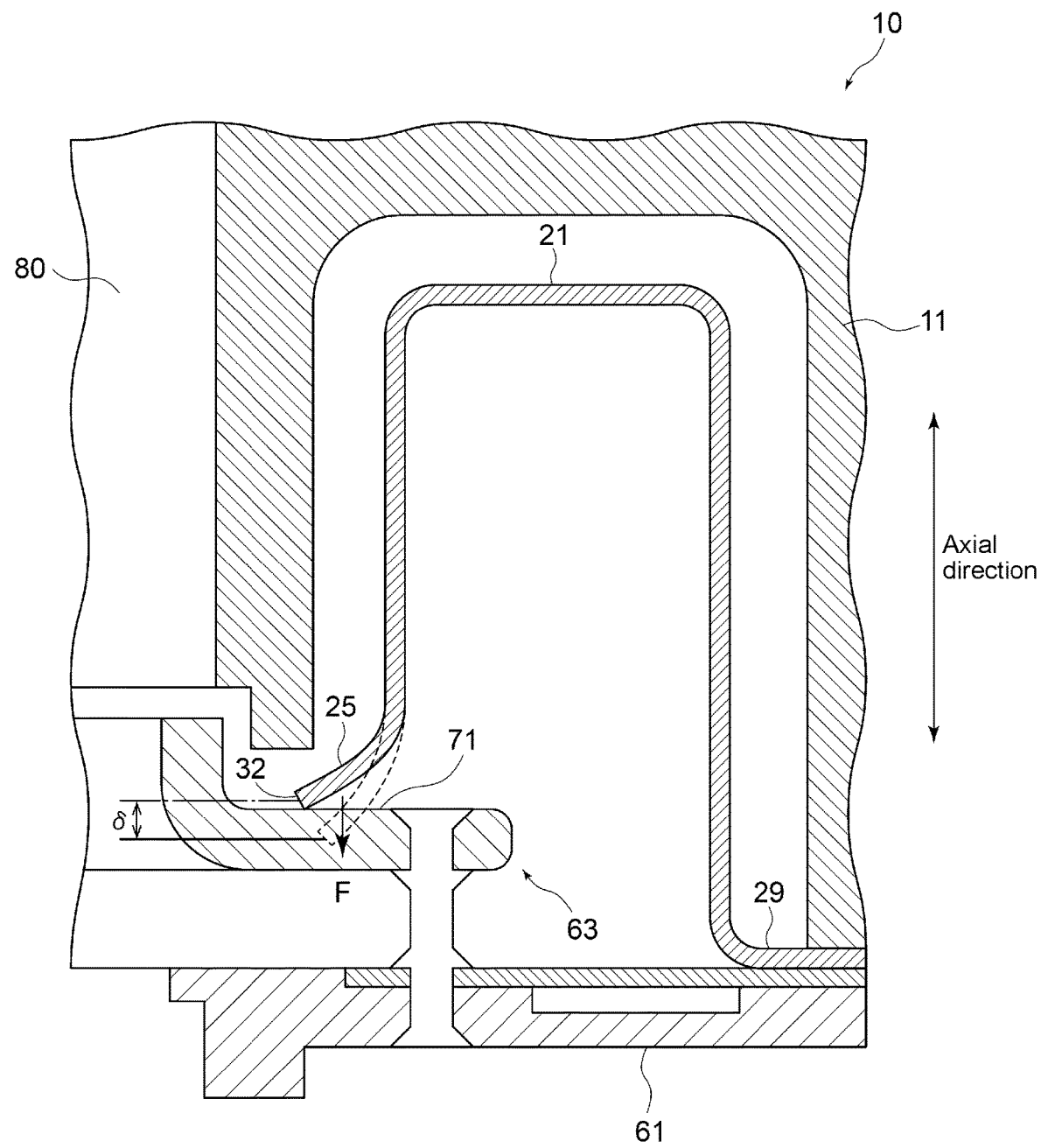
FIG. 4 is a view of the shape of a first heat shield core according to some embodiments.
Figure 5:
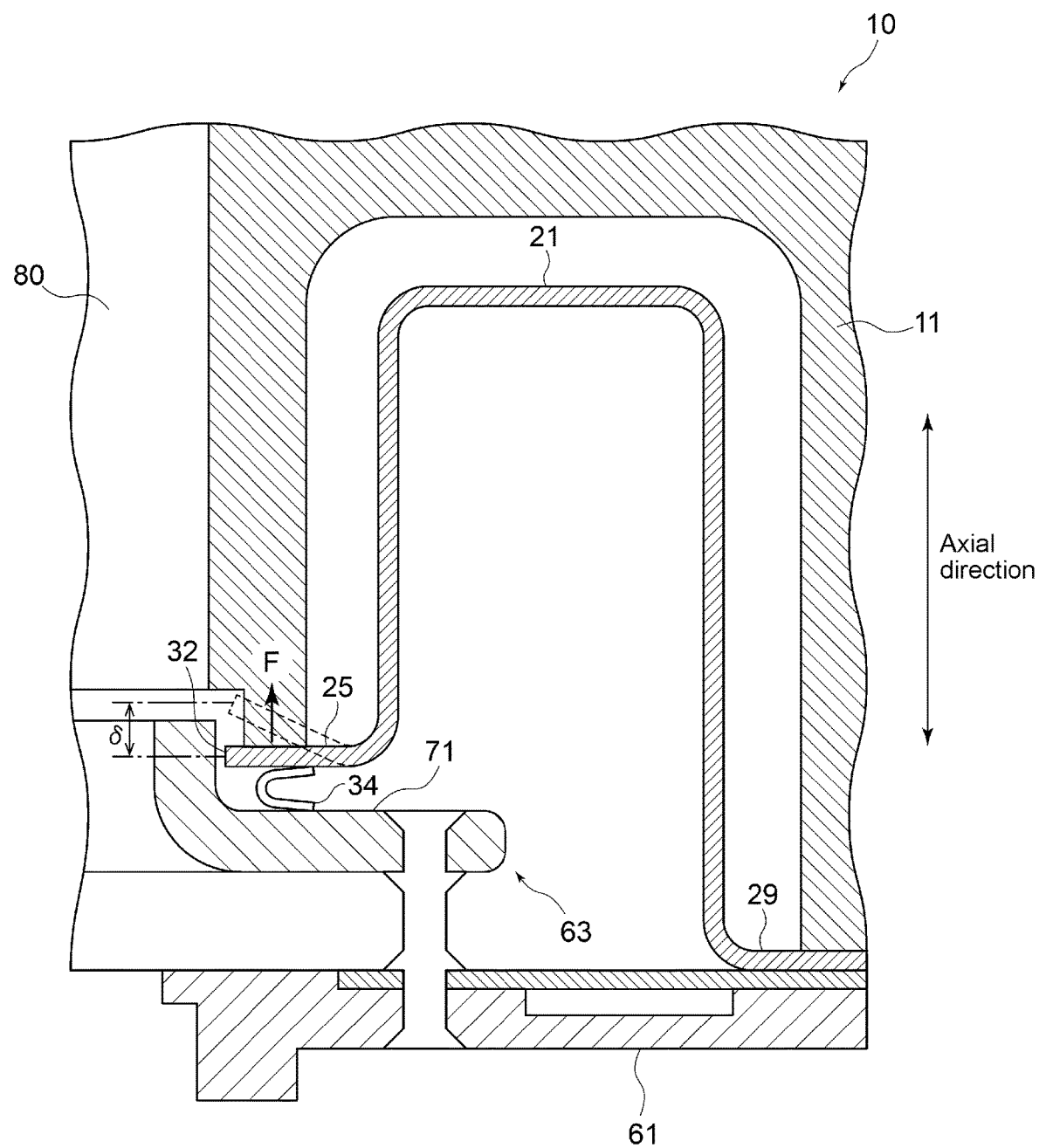
FIG. 5 is a view showing a modified example of the first heat shield core according to some embodiments.
Figure 6:
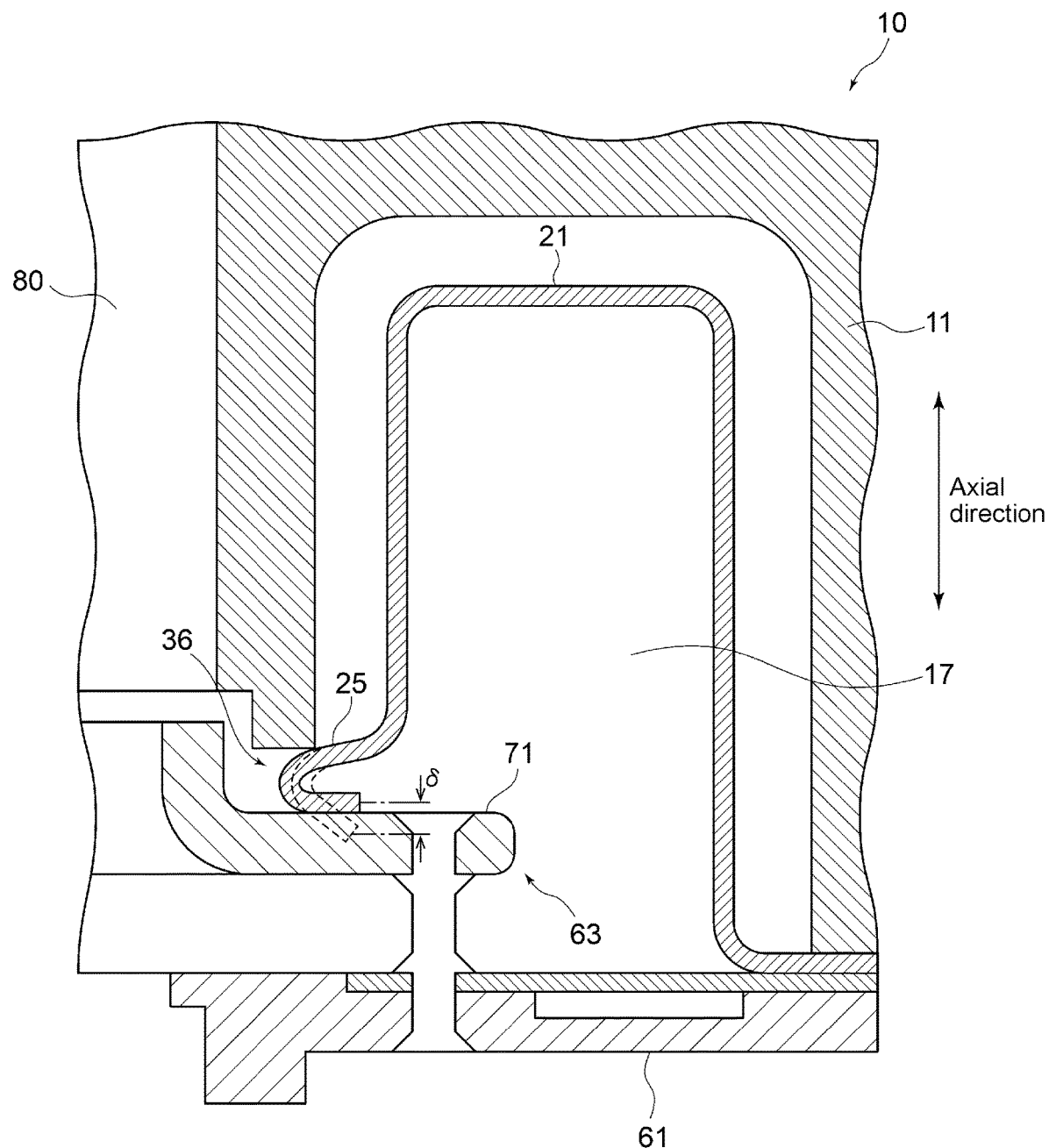
FIG. 6 is a view showing another modified example of the first heat shield core according to some embodiments.

The second embodiment to be described below aims at solving the problem of reducing the heat stress in the first heat shield core 21, which is different from the problem (improving efficiency of the turbine by suppressing heat radiation of the exhaust gas and improving sealing performance) to be solved by the first embodiment described above. The second embodiment will be described with reference to FIGS. 4 to 6. FIG. 4 is a view of the shape of the first heat shield core 21 according to some embodiments. FIG. 5 is a view showing a modified example of the first heat shield core 21 according to some embodiments. FIG. 6 is a view showing another modified example of the first heat shield core 21 according to some embodiments.

In the present embodiment, as shown in FIGS. 4 and 5, the first inner flange portion 25 of the first heat shield core 21 is configured to be elastically deformable so as to be pressed against the side of the outer housing portion 11 or the side of the variable nozzle unit 60 while being mounted to the turbine housing 10. In the example of FIG. 4, the first heat shield core 21 is disposed such that the first outer flange portion 29 is interposed between the outer housing portion 11 and the nozzle mount 61, and the first inner flange portion 25 is pressed against the annular portion 71 of the nozzle plate 63.

Referring to FIG. 4, the first inner flange portion 25 is formed into a shape indicated by a dashed line in FIG. 4 and extends in the direction from the nozzle plate 63 toward the nozzle mount 61 in the axial direction in a natural state before mounting. The first inner flange portion 25 is installed so as to be deformed to be pushed up toward a turbine outlet side and to abut on the annular portion 71 of the nozzle plate 63 in the axial direction when the first heat shield core 21 and the variable nozzle unit 60 are mounted to the turbine housing 10. The axial position of an end part 32 of the first flange portion after mounting is deformed by δ from the natural state before mounting, and the first inner flange portion 25 after mounting has a restoring force F by δ in a direction to be pressed against the annular portion 71.

In the modified example shown in FIG. 5, an embodiment is shown in which the first inner flange portion 25 is configured to be pressed against the side of the outer housing portion 11. In the present embodiment, in a natural state before mounting, the first inner flange portion 25 is formed into a shape bent toward the turbine outlet side in the axial direction as indicated by a dashed portion in FIG. 5. Upon mounting, the first inner flange portion 25 is installed such that the dashed portion is deformed to be pushed down toward the side of the annular portion 71 of the nozzle plate 63 and abuts on the outer housing portion 11 in the axial direction. Thus, the first inner flange portion 25 has the restoring force F by δ in the direction to be pressed against the outer housing portion 11.

According to the embodiments described above, since the first inner flange portion 25 of the first heat shield core 21 is configured to be elastically deformable so as to be pressed against the side of the outer housing portion 11 or the side of the variable nozzle unit 60, and is not restrained firmly, it is possible to absorb thermal deformation of the first heat shield core 21 to some extent by elastic deformation of the first inner flange portion 25 and to reduce the heat stress in the first heat shield core 21.

In the example shown in FIG. 4, since the first inner flange portion 25 is pressed against the side of the variable nozzle unit 60, it is also possible to seal the exhaust gas in the scroll flow passage 17. Thus, it is possible to reduce the amount of the exhaust gas leaking out not via the turbine and to improve efficiency of the turbine. On the other hand, if the configuration is adopted in which the first inner flange portion 25 is pressed against the side of the outer housing portion 11 as in the example shown in FIG. 5, it is desirable to concurrently use an annular seal portion 34 in order to suppress leakage of the exhaust gas.

In the embodiment shown in FIG. 6, the first inner flange portion 25 includes a bent part 36 formed by bending a part of the first inner flange portion 25. The bent part 36 is interposed between the variable nozzle unit 60 and the outer housing portion 11 so as to be elastically deformable in the axial direction. In the present embodiment, the bent part 36 in a natural state before mounting indicated by a dashed portion is deformed to be folded in the axial direction upon mounting, and is installed to be interposed between the outer housing portion 11 and the annular portion 71 of the nozzle plate 63.

According to the present embodiment, since the bent part 36 provided for the first inner flange portion 25 of the first heat shield core 21 is elastically deformed, it is possible to effectively absorb thermal deformation of the first heat shield core 21 and to reduce the heat stress generated in the first heat shield core 21. Therefore, it is possible to improve durability of the first heat shield core 21 with a simple configuration without additionally using another member. Furthermore, in the present embodiment, since the bent part 36 is interposed between the outer housing portion 11 and the annular portion 71 of the nozzle plate 63, it is also possible to suppress leakage of the exhaust gas from the scroll flow passage 17 as in the embodiment exemplified in FIG. 4.

The first heat shield core 21 tends to be deformed by the heat input from the exhaust gas in the scroll flow passage 17. Thus, in each of the embodiments described above, it is desirable to make the displacement δ from the natural state greater than a thermal deformation amount in order to prevent the first inner flange portion 25 having the restoring force F from restoring to the natural state due to the influence of thermal deformation.

Moreover, the second embodiment including the examples of FIGS. 4 to 6 can be used in combination with the various configurations described in the first embodiment. For example, in the configuration exemplified in FIG. 4, at least the one annular seal portion 23 may be disposed between the first heat shield core 21 and the outer housing portion 11. Thus, it is possible to achieve firmer seal performance.

(Cooling Structure of Turbine Outlet Flow Passage)

Figure 7:
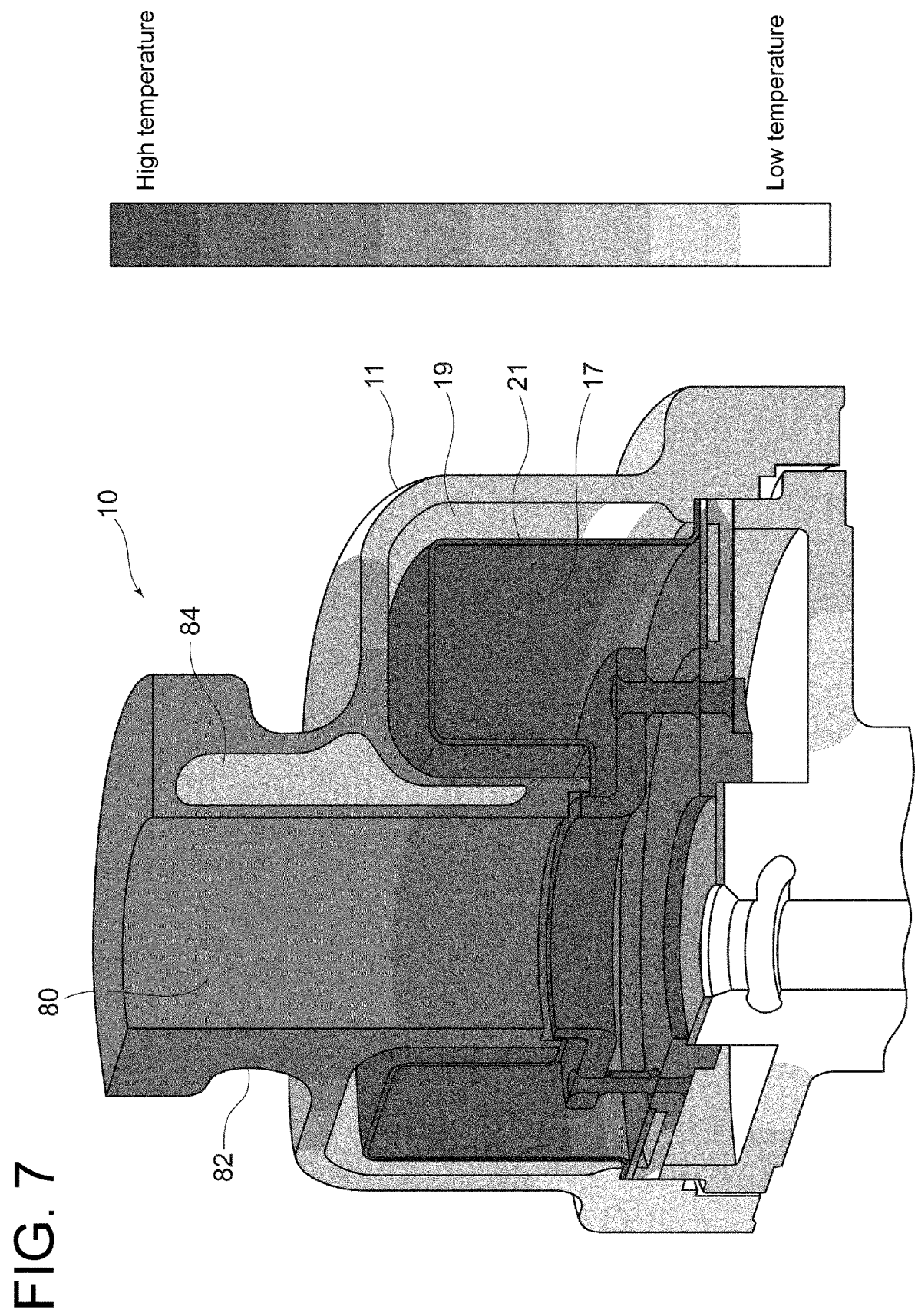
FIG. 7 is a view of a temperature distribution of an outer housing portion and a cooling structure of a turbine outlet flow passage according to some embodiments.
Figure 8:
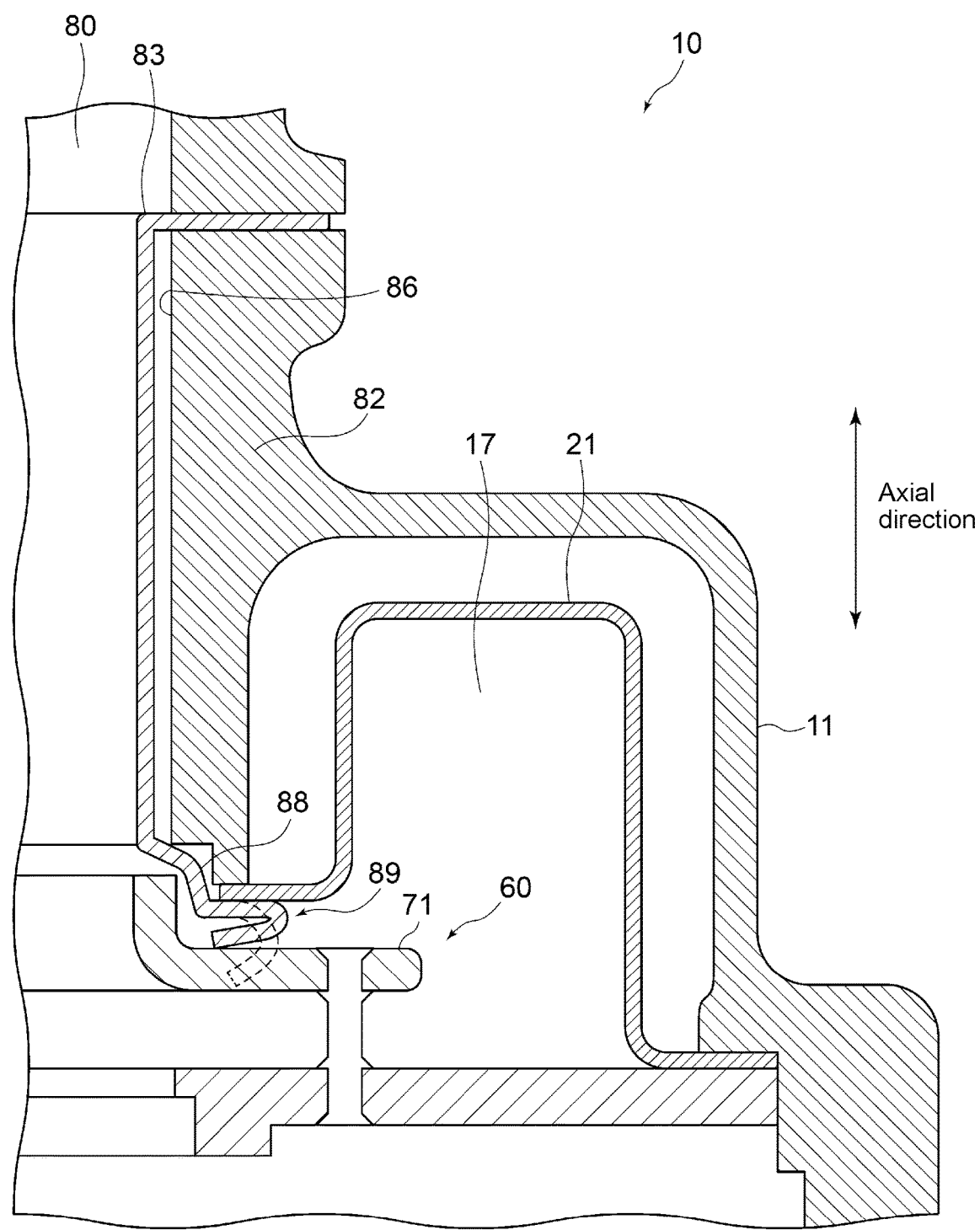
FIG. 8 is a view of the configuration of the turbine outlet flow passage according to some embodiments.

Some embodiments regarding a cooling structure of the turbine housing 10 in a turbine outlet flow passage will be described below with reference to FIGS. 7 and 8. FIG. 7 is a view of a temperature distribution of the outer housing portion 11 and the cooling structure of a turbine outlet flow passage 80 according to some embodiments. FIG. 8 is a view of the configuration of the turbine outlet flow passage according to some embodiments.

Each embodiment to be described below is applicable to both the first embodiment and the second embodiment described above.

As shown in FIG. 7, the temperature distribution of the outer housing portion 11 has relatively low temperature since heat radiation of the exhaust gas in the scroll flow passage 17 is suppressed by forming the insulated space 19 in a part where the first heat shield core 21 is disposed. On the other hand, in an outlet wall portion 82 where the exhaust gas after passing through the turbine impeller passes, the outer housing portion 11 is directly exposed to the exhaust gas unless special measures are taken. As a result, the temperature distribution of the outer housing portion 11 tends to have high temperature. In this case, a material for the outer housing portion 11 needs to be chosen in accordance with a condition of relatively high temperature in the outlet wall portion 82, decreasing the freedom of choice of the material for the outer housing portion 11.

Thus, in some embodiments, as shown in FIG. 7, the outlet wall portion 82 of the outer housing portion 11 internally includes a cooling passage 84 where a refrigerant flows.

According to the present embodiment, since the outlet wall portion 82 internally includes the cooling passage 84 in the turbine outlet flow passage 80, it is possible to entirely decrease the temperature of the outer housing portion 11 in combination with adoption of the first heat shield core 21. Thus, it is possible to improve strength without adopting an expensive material as the material for the outer housing portion 11 and to reduce a manufacturing cost.

In an embodiment, the refrigerant contains compressed air generated by the compressor. Thus, it is possible to cool the outlet wall portion 82 of the outer housing portion 11 without additionally preparing a refrigerant, making it possible to reduce the cost.

In some embodiments, as shown in FIG. 8, the turbine housing 10 includes a third heat shield core 83 disposed in the turbine outlet flow passage 80 so as to face an inner wall surface 86 of the outlet wall portion 82.

According to the present embodiment, the third heat shield core 83 prevents the turbine outlet wall portion 82 from being directly exposed to the exhaust gas, making it possible to suppress transfer of the heat of the exhaust gas to the turbine outlet wall portion 82. Therefore, it is possible to entirely decrease the temperature of the outer housing portion 11 in combination with adoption of the first heat shield core 21, to improve the strength without adopting the expensive material as the material for the outer housing portion 11, and reduce the manufacturing cost.

In an embodiment, as exemplified in FIG. 8, the third heat shield core 83 includes a second flange portion 88 protruding radially outward at an axial position between the variable nozzle unit 60 and the outlet wall portion 82 of the outer housing portion 11. A bent part 89 formed by bending a part of the second flange portion 88 is interposed between the variable nozzle unit 60 and the outlet wall portion 82 so as to be elastically deformable in the axial direction. In the example of FIG. 8, the bent part is bent such that its cross-sectional surface forms a C-shape and is formed by compressing a natural state (dashed portion of FIG. 8) before mounting in the axial direction by the first inner flange portion 25 and the annular portion 71 upon mounting.

According to the present embodiment, since the bent part 89 of the second flange portion 88 is interposed between the variable nozzle unit 60 and the outlet wall portion 82, and has a restoring force to the natural state, it is possible to reduce the amount of the exhaust gas leaking out from the scroll flow passage 17 to the outlet flow passage 80 not via the turbine impeller. Therefore, it is possible to improve efficiency of the turbine. Furthermore, since the bent part 89 of the third heat shield core 83 is interposed between the variable nozzle unit 60 and the outlet wall portion 82 so as to be elastically deformable, and the second flange portion 88 is not restrained firmly, it is possible to absorb thermal deformation of the third heat shield core 83 to some extent by elastic deformation of the bent part 89 and to reduce a heat stress in the third heat shield core 83. The form of the bent part 89 is not limited to the form exemplified in FIG. 8. For example, forms to be shown in FIGS. 9 to 11 may be adopted.

Figure 9:
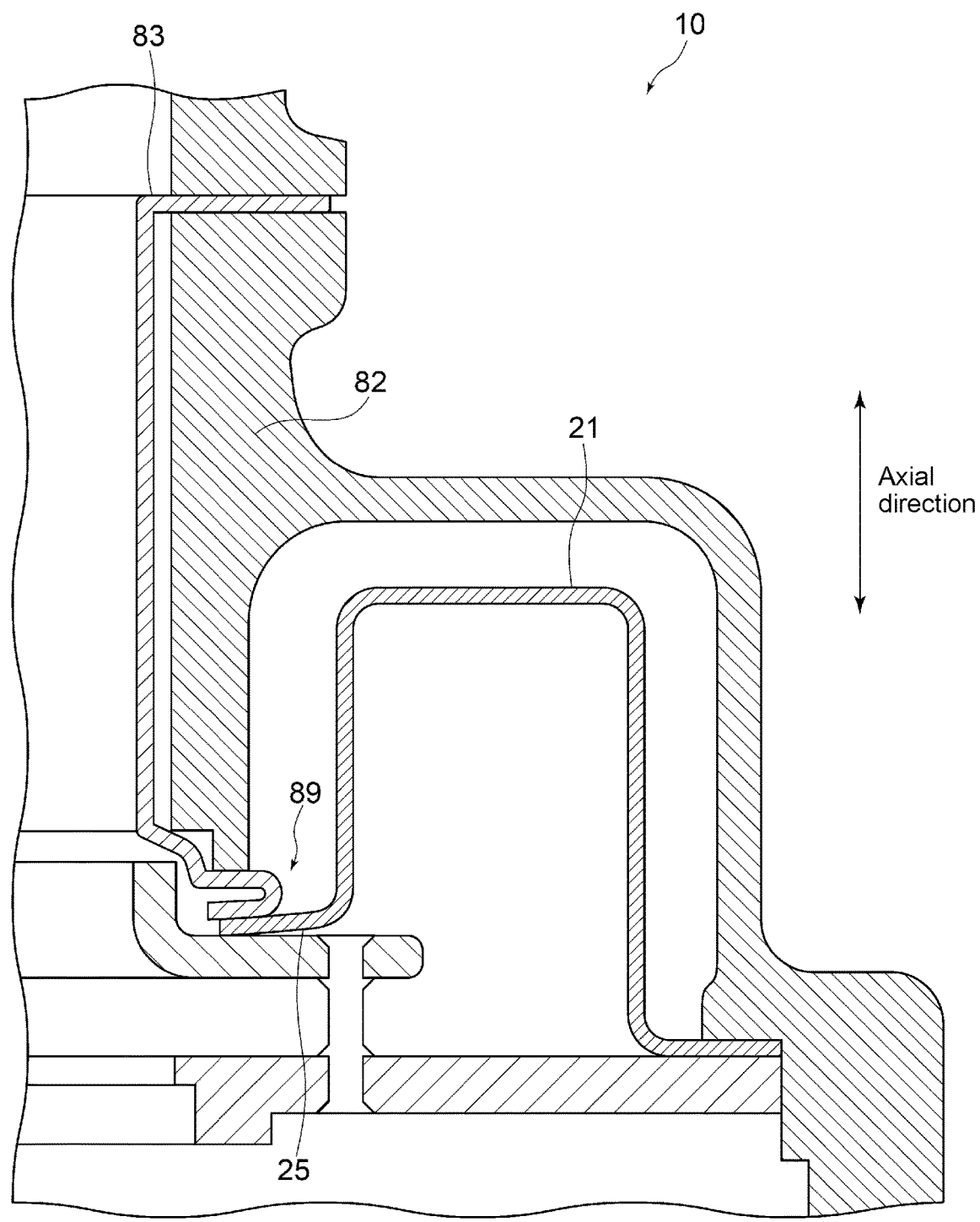
FIG. 9 is a view showing a modified example of a third heat shield core according to some embodiments.
Figure 10:
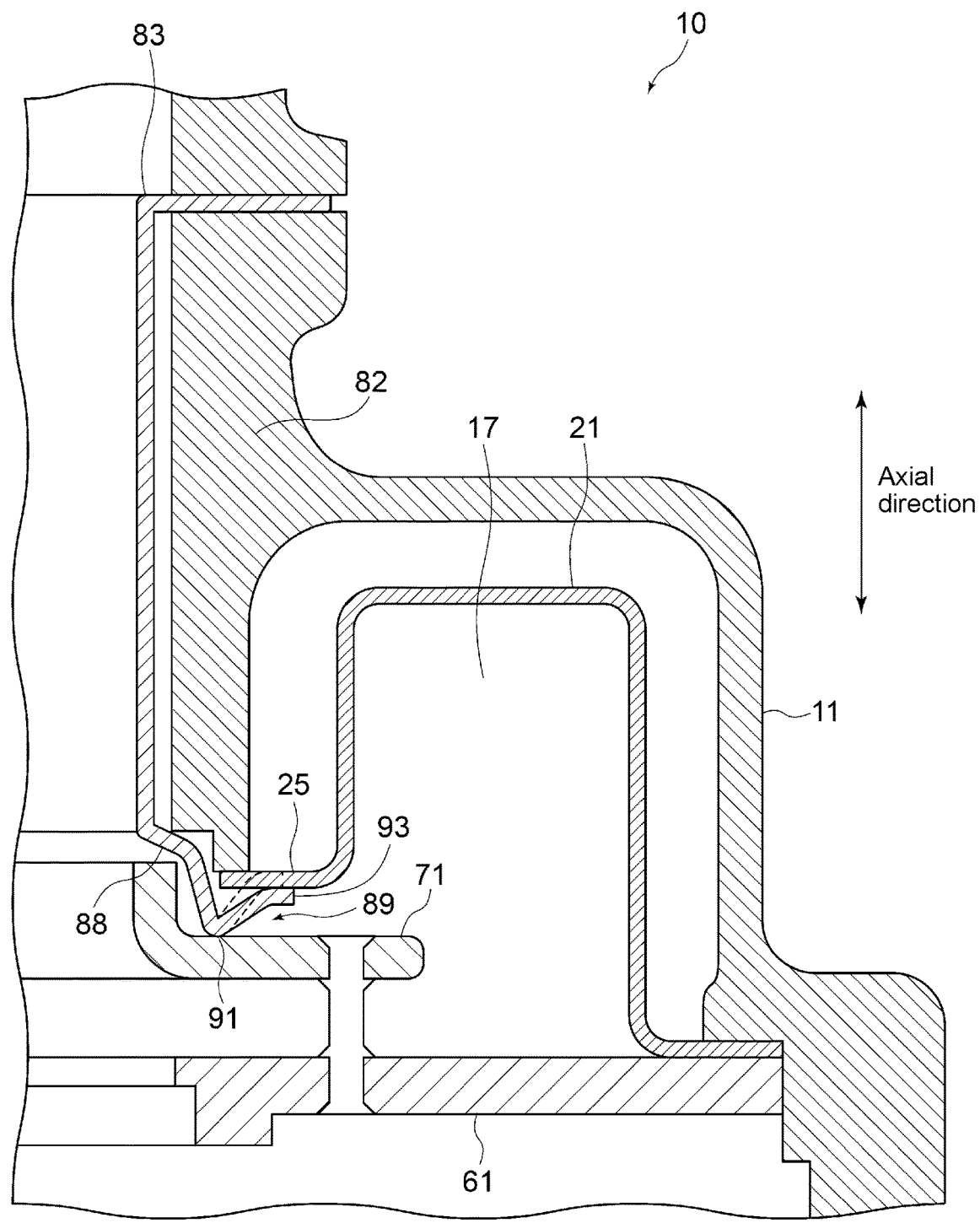
FIG. 10 is a view showing a modified example of the third heat shield core according to some embodiments.
Figure 11:
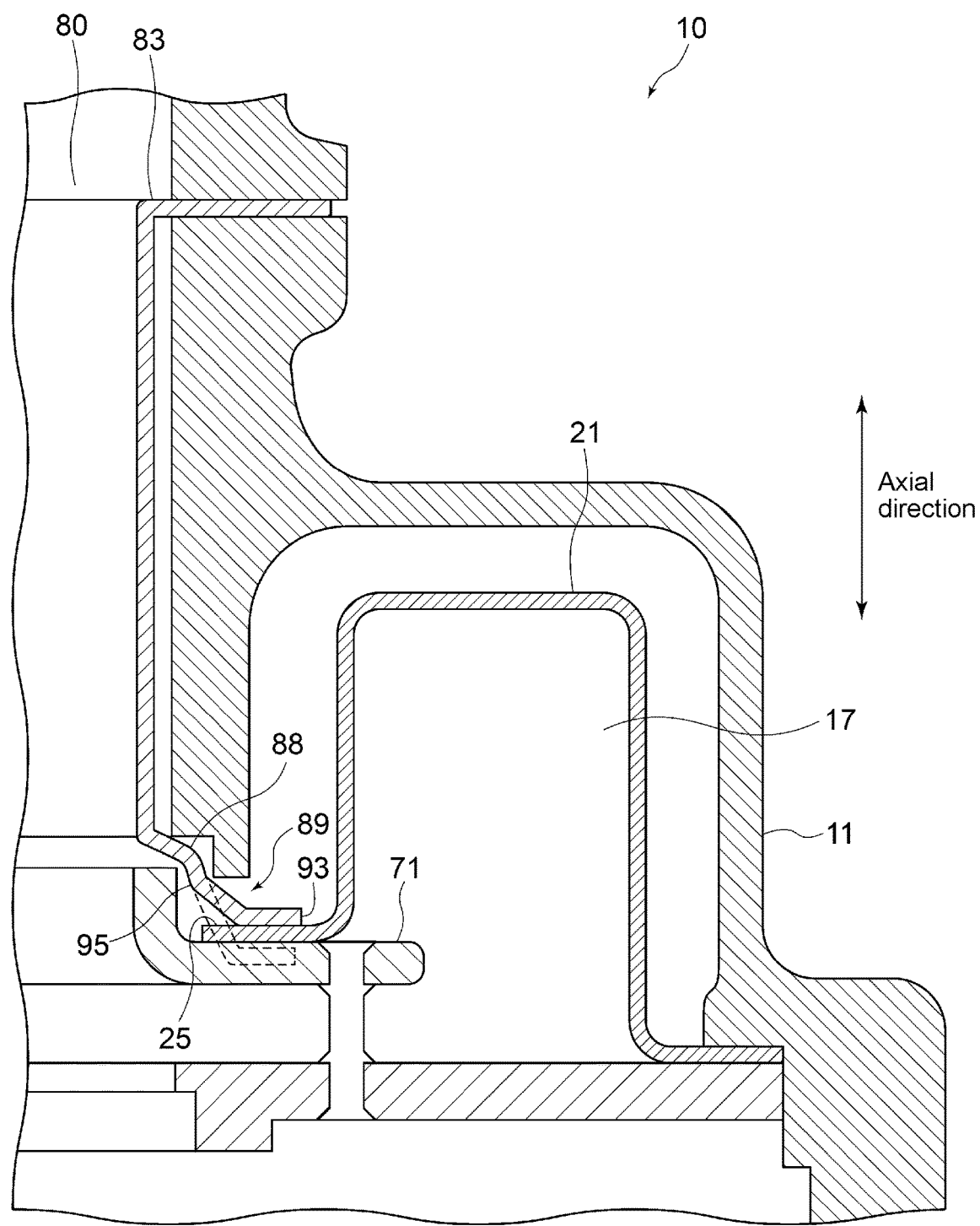
FIG. 11 is a view showing a modified example of the third heat shield core according to some embodiments.

FIGS. 9 to 11 are each a view showing a modified example of the third heat shield core 83 according to some embodiments.

In the modified example shown in FIG. 9, the bent part 89 is interposed between the outlet wall portion 82 and the first inner flange portion 25 of the first heat shield core 21 at the axial position. According to the configuration, in addition to the above-described effects, it is possible to prevent the bent part 89 of the third heat shield core 83 from being directly exposed to the exhaust gas and to improve durability of the third heat shield core 83.

In the modified example shown in FIG. 10, the bent part 89 is formed by folding the second flange portion 88 into a dogleg. In this case, the second flange portion 88 on the outer side of a folded portion 91 abutting on the annular portion 71 of the nozzle plate 63 is folded to the side of the turbine outlet flow passage 80 in the axial direction. In addition, the outer side of the folded portion 91 is installed so as to be pushed down toward the side of the nozzle mount 61 in the axial direction upon mounting from a natural state (dashed portion of FIG. 10) before mounting. Thus, the first inner flange portion 25 of the first heat shield core 21 is pressed against the outlet wall portion 82 by an outer peripheral end part 93 of the second flange portion 88 abutting on the first inner flange portion 25.

According to the present embodiment, the bent part 89 is configured to be elastically deformable in the axial direction having the folded portion 91 as a fulcrum in a region on the outer side of the folded portion 91. Thus, it is possible to reduce the heat stress in the third heat shield core 83. In addition, with the restoring force after mounting, it is possible to seal the scroll flow passage 17 between the outer housing portion 11 and the nozzle plate 63. Thus, it is possible to suppress leakage of the exhaust gas from the scroll flow passage 17.

In the modified example shown in FIG. 11, the second flange portion 88 forms the bent part 89 by folding the outer side of a folded portion 95 to the side of the turbine outlet flow passage 80 in the axial direction. In addition, the outer side of the folded portion 95 is mounted and installed so as to be pushed up toward the side of the turbine outlet flow passage 80 in the axial direction from a natural state (dashed portion of FIG. 11) before mounting. Thus, the first inner flange portion 25 is pressed against the annular portion 71 by the outer peripheral end part 93 of the second flange portion 88 abutting on the first inner flange portion 25 of the first heat shield core 21.

According to the present embodiment, the bent part 89 is configured to be elastically deformable in the axial direction in the region on the outer side of the folded portion 95. Thus, it is possible to reduce the heat stress in the third heat shield core 83. In addition, since the first inner flange portion 25 is pressed against the annular portion 71 by the restoring force after mounting, it is possible to seal the scroll flow passage 17 between the outer housing portion 11 and the nozzle plate 63. Thus, it is possible to suppress leakage of the exhaust gas from the scroll flow passage 17.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "containing" or "having" one constitutional element is not an exclusive expression that excludes the presence of other constitutional elements.

REFERENCE SIGNS LIST

10 Turbine housing
11 Outer housing portion
13 Inner wall
15 Spiral space
17 Scroll flow passage
19 Insulated space
21 First heat shield core
23 Annular seal portion
25 First inner flange portion
27 Spring ring
28 Snap ring
29 First outer flange portion
30 Bearing housing
40 Seal ring
50 Rotational shaft
60 Variable nozzle unit
61 Nozzle mount
62 Second heat shield core
63 Nozzle plate
64 Swaging portion
65 Nozzle support
67 Gas path surface
69 Insulated space
71 Annular portion
73 Cylindrical portion
80 Turbine outlet flow passage
82 Outlet wall portion
83 Third heat shield core
84 Cooling passage
88 Second flange portion
100 Turbocharger

The invention claimed is:

1. A turbine housing comprising:
an outer housing portion which includes an inner wall internally forming a spiral space;
a first heat shield core which separates the spiral space into a scroll flow passage where an exhaust gas flows and a heat shield space positioned on a side of the inner wall, the first heat shield core being disposed so as to face the inner wall in the spiral space;
a variable nozzle unit for adjusting a flow of the exhaust gas from the scroll flow passage toward an impeller, the variable nozzle unit being disposed on a side opposite to the outer housing portion across the first heat shield core in an axial direction; and
at least one annular seal portion disposed between the first heat shield core and the outer housing portion in the axial direction,
wherein the outer housing portion includes an axial protrusion which axially protrudes toward the first heat shield core such that the at least one annular seal portion is held between the axial protrusion and the first heat shield core.

2. The turbine housing according to claim 1,
wherein the variable nozzle unit includes:
a nozzle mount;
a nozzle plate disposed separately from the nozzle mount on a turbine outlet side;
a nozzle support coupling and fixing the nozzle mount and the nozzle plate; and
a plurality of variable nozzles circumferentially arranged between the nozzle mount and the nozzle plate, and adjusting the flow of the exhaust gas,
wherein the nozzle plate includes:
an annular portion facing the nozzle mount; and
a cylindrical portion protruding from an inner circumferential end of the annular portion toward the outer housing portion in the axial direction,
wherein the first heat shield core includes a first inner flange portion surrounding the cylindrical portion of the nozzle plate, and
wherein the first inner flange portion is configured such that at least a radial region of the first inner flange portion is pressed against the annular portion of the nozzle plate by the annular seal portion.

3. The turbine housing according to claim 1,
wherein the at least the one annular seal portion includes a snap ring configured to be elastically deformable in a radial direction.

4. The turbine housing according to claim 1,
wherein the outer housing portion includes an outlet wall portion which forms a turbine outlet flow passage where the exhaust gas after passing through a turbine flows, and
wherein the outlet wall portion internally includes a cooling passage where a refrigerant flows.

5. The turbine housing according to claim 1, wherein the outer housing portion includes an outlet wall portion which forms a turbine outlet flow passage where the exhaust gas after passing through a turbine flows, and wherein the outlet wall portion internally includes a cooling passage where compressed air generated by a compressor flows.

6. The turbine housing according to claim 1,
wherein the outer housing portion includes an outlet wall portion which forms a turbine outlet flow passage where the exhaust gas after passing through a turbine flows, and
wherein the turbine housing further comprises a third heat shield core disposed in the turbine outlet flow passage so as to face an inner wall surface of the outlet wall portion.

7. The turbine housing according to claim 6,
wherein the third heat shield core includes a second flange portion protruding radially outward at an axial position between the variable nozzle unit and the outlet wall portion of the outer housing portion, and a bent part formed by bending a part of the second flange portion is interposed between the variable nozzle unit and the outlet wall portion so as to be elastically deformable in the axial direction.

8. A turbocharger comprising:
a turbine which includes the turbine housing according to claim 1 and an impeller configured to be rotated by the exhaust gas guided via the scroll flow passage of the turbine housing; and
a compressor driven by the turbine.

9. A turbine housing comprising:
an outer housing portion which includes an inner wall internally forming a spiral space;
a first heat shield core which separates the spiral space into a scroll flow passage where an exhaust gas flows and a heat shield space positioned on a side of the inner wall, the first heat shield core being disposed so as to face the inner wall in the spiral space;
a variable nozzle unit for adjusting a flow of the exhaust gas from the scroll flow passage toward an impeller, the variable nozzle unit being disposed on a side opposite to the outer housing portion across the first heat shield core in an axial direction; and
at least one annular seal portion disposed between the first heat shield core and the outer housing portion in the axial direction,
wherein the variable nozzle unit includes:
a nozzle mount;
a nozzle plate disposed separately from the nozzle mount on a turbine outlet side:
a nozzle support coupling and fixing the nozzle mount and the nozzle plate; and
a plurality of variable nozzles circumferentially arranged between the nozzle mount and the nozzle plate, and adjusting the flow of the exhaust gas,
wherein the nozzle plate includes:
an annular portion facing the nozzle mount; and
a cylindrical portion protruding from an inner circumferential end of the annular portion toward the outer housing portion in the axial direction,
wherein the first heat shield core includes a first inner flange portion surrounding the cylindrical portion of the nozzle plate, and
wherein the first inner flange portion is configured such that at least a radial region of the first inner flange portion is pressed against the annular portion of the nozzle plate by the annular seal portion,
wherein the turbine housing further comprises a second heat shield core which covers a region of a gas path surface of the nozzle mount contacting the exhaust gas from an outermost peripheral part thereof to at least an inner side of the nozzle support in a radial direction.

10. The turbine housing according to claim 9, further comprising an insulated space disposed between the nozzle mount and the second heat shield core.

11. The turbine housing according to claim 9,
wherein the second heat shield core is interposed and fixed between the nozzle mount and a swaging portion of the nozzle support.

12. A turbine housing comprising:
an outer housing portion which includes an inner wall internally forming a spiral space;
a first heat shield core which separates the spiral space into a scroll flow passage where an exhaust gas flows and a heat shield space positioned on a side of the inner wall, the first heat shield core being disposed so as to face the inner wall in the spiral space;
a variable nozzle unit for adjusting a flow of the exhaust gas from the scroll flow passage toward an impeller, the variable nozzle unit being disposed on a side opposite to the outer housing portion across the first heat shield core in an axial direction; and
at least one annular seal portion disposed between the first heat shield core and the outer housing portion in the axial direction,
wherein the at least the one annular seal portion includes a spring ring configured to be elastically deformable in the axial direction,
wherein the variable nozzle unit includes:
a nozzle mount;
a nozzle plate disposed separately from the nozzle mount on a turbine outlet side;
a nozzle support coupling and fixing the nozzle mount and the nozzle plate; and
a plurality of variable nozzles circumferentially arranged between the nozzle mount and the nozzle plate, and adjusting the flow of the exhaust gas, and
wherein the first heat shield core includes:
a first outer flange portion forming an outermost peripheral part of the first heat shield core, and fixed so as to be interposed between the outer housing portion and an outer peripheral part of the nozzle mount; and
a first inner flange portion forming an innermost peripheral part of the first heat shield core, and elastically fixed between the outer housing portion and the nozzle plate via the spring ring.

* * * * *